United States Patent [19]

Mikan

[11] Patent Number: 5,532,476

[45] Date of Patent: Jul. 2, 1996

[54] REDUNDANT INDICATOR FOR DETECTING NEUTRAL POSITION OF JOYSTICK MEMBER

[76] Inventor: Peter J. Mikan, 31 Greenfield Rd., Milford, Conn. 06460

[21] Appl. No.: 360,285

[22] Filed: Dec. 21, 1994

[51] Int. Cl.$^6$ .................................................. G01D 5/34
[52] U.S. Cl. ........................... 250/221; 250/229; 345/161
[58] Field of Search ................................... 250/221, 229; 345/161

[56] References Cited

U.S. PATENT DOCUMENTS

| | | | |
|---|---|---|---|
| 4,459,022 | 7/1984 | Morey | 250/221 |
| 4,686,361 | 8/1987 | Bard | 250/221 |
| 4,731,530 | 3/1988 | Mikan | 250/229 |
| 4,761,547 | 8/1988 | Torihata et al. | 250/221 |
| 4,766,306 | 8/1988 | Bichsel et al. | |
| 4,825,157 | 4/1989 | Mikan . | |
| 4,855,704 | 8/1989 | Betz | 336/132 |
| 4,935,728 | 6/1990 | Kley . | |
| 4,943,715 | 7/1990 | Konishi | 250/229 |
| 5,008,534 | 4/1991 | Yonezawa et al. | 250/229 |
| 5,065,146 | 11/1991 | Garrett | 250/221 |
| 5,252,821 | 10/1993 | Sugimura . | |

Primary Examiner—Georgia Y. Epps
Assistant Examiner—Jacqueline M. Steady
Attorney, Agent, or Firm—H. Gibner Lehmann; K. Gibner Lehmann

[57] ABSTRACT

An electronic controller having a joystick member, the controller utilizing one or more electrical output circuits characterized by parameters which vary in accordance with the displacement of the joystick member from a "neutral" position in X-axis and Y-axis directions, to control positions on opposite sides of the "neutral" position. The joystick member has a light-reflecting area which traverses a predetermined field of travel as the member is moved between its various positions. A light emitter-sensor circuit including a light source and a light sensor is disposed in the field of travel of the light-reflecting-area of the joystick member. The emitter-sensor circuit generates an electrical signal from a reflected beam of light which is emitted from the light source and is reflected from the reflecting area of the joystick member and onto the light sensor, only when the joystick member is at, or very close to its "neutral" position. An especially accurate, back-up or redundant-type indication or confirmation of the "neutral" positioning of the joystick member can thereby be achieved at minimal cost, for safety and/or reliability of operation.

19 Claims, 2 Drawing Sheets

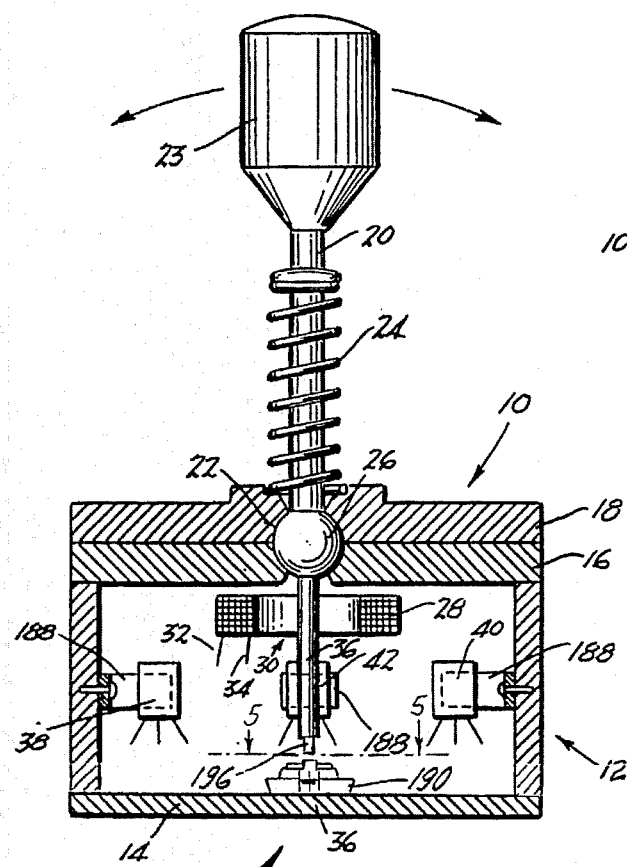
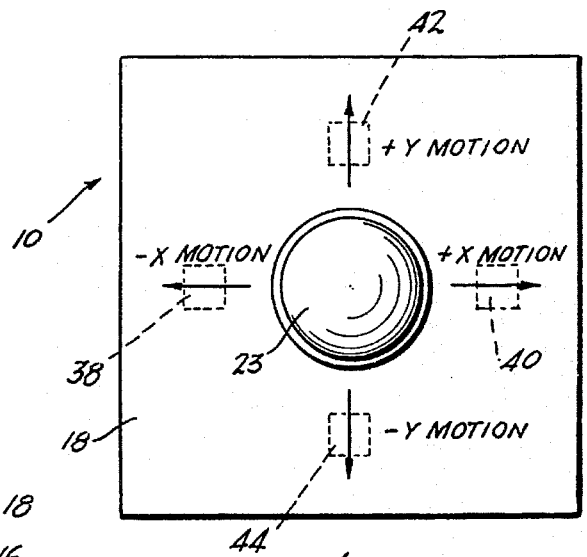
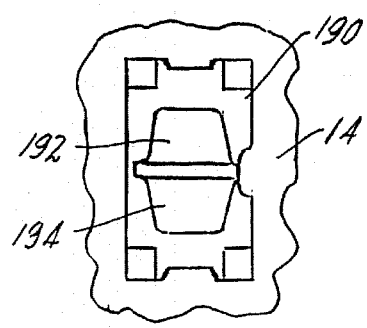
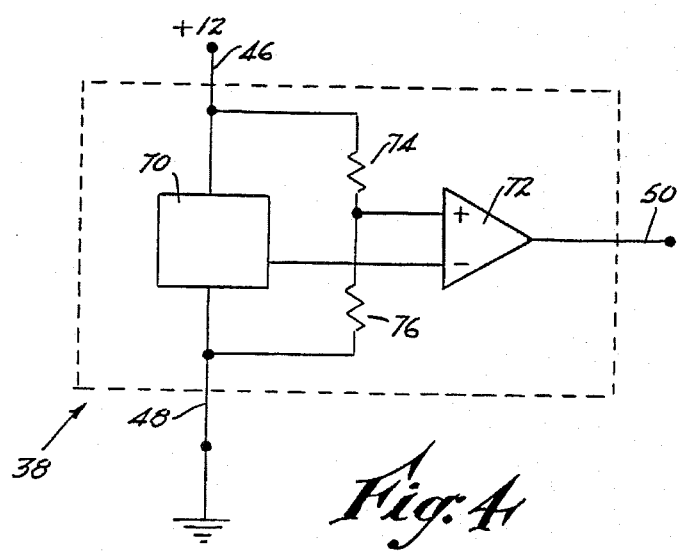
Fig. 1
Fig. 2
Fig. 5
Fig. 4

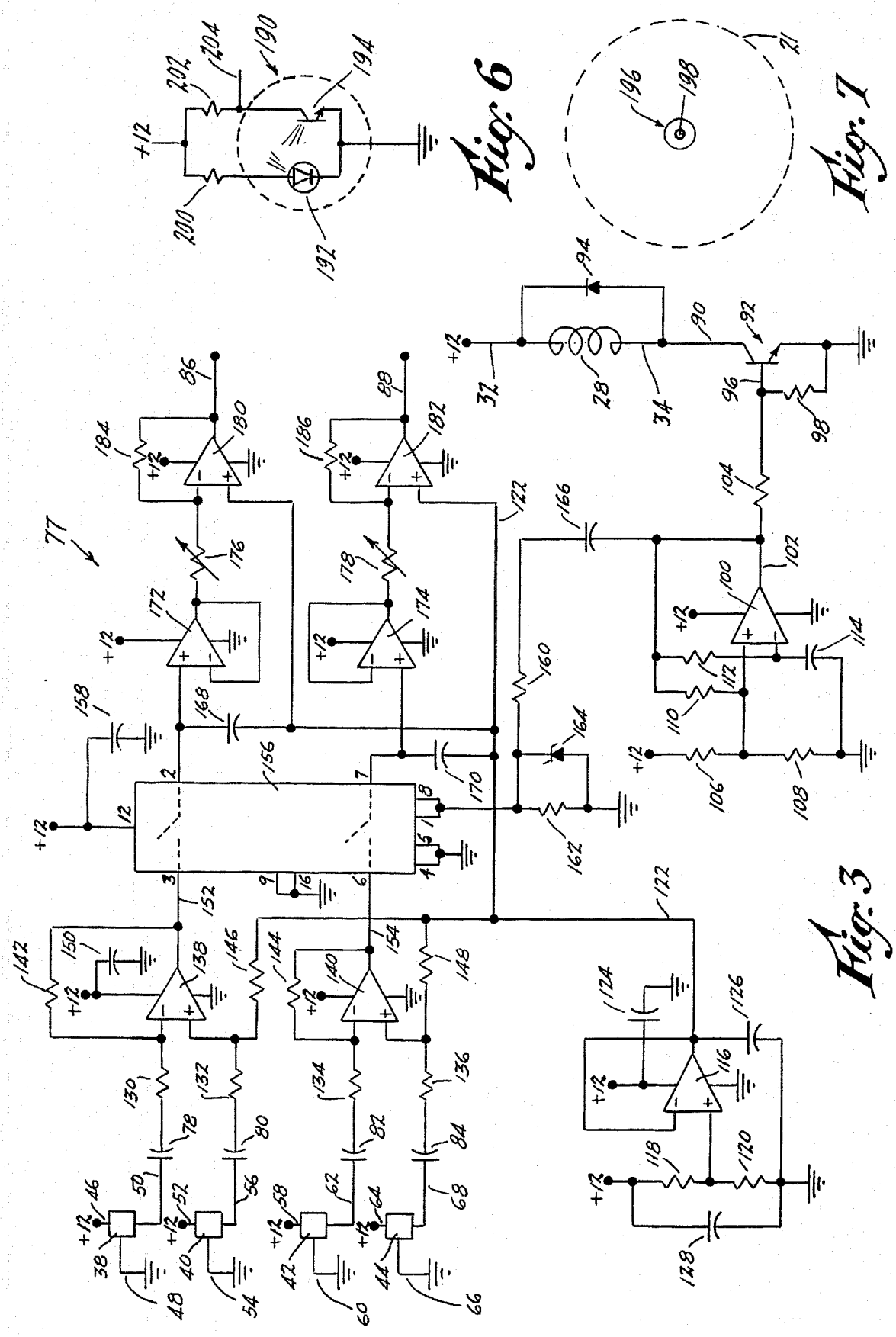

REDUNDANT INDICATOR FOR DETECTING NEUTRAL POSITION OF JOYSTICK MEMBER

NO CROSS REFERENCES TO RELATED APPLICATIONS

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

FIELD OF THE INVENTION

This invention relates generally to joystick controllers, and more particularly to devices for accurately detecting specific ranges of movement of the actuator arms of such controllers.

More particularly, the present invention relates to improvements in joysticks. An example of a commercial joystick is shown in applicant's U.S. Pat. No. 4,825,157 issued Apr. 25, 1989, entitled HALL-EFFECT CONTROLLER.

DESCRIPTION OF THE RELATED ART INCLUDING INFORMATION DISCLOSED UNDER 37 CFR §§1.97–1.99

The entire disclosure of U.S. Pat. No. 4,825,157 above identified is incorporated into the present application, by specific reference. One of the problems inherent in all prior joysticks was that of accurately detecting the center or "neutral" position of the actuator arm or control member. In practice, the usual X-axis and Y-axis outputs that are utilized in conventional joystick constructions have been heavily relied upon for adequate accuracy and repeatability, as well as freedom from inadvertent failure.

Under certain applications and in actual practice, however, it has been found that the reliability is, in many cases, inadequate. With some systems, a temporary loss of signal such as from an intermittent or noisy potentiometer, may prove to be of only minimal concern.

With other systems, however, such as applications involving control of large or heavy equipment, and where a joystick failure can result in injury to personnel and/or damage to factory equipment, there has arisen a need to verify or otherwise check, in a reliable manner, the joystick operation, and more particularly to be able to confirm when the actuator member of a joystick was truly disposed at a physical center or "neutral" position.

Moreover, attempts to solve the problem of providing an independent check or back-up reading of such a "neutral" position have either been unsuccessful, or alternately not workable from a commercial or practical standpoint.

SUMMARY OF THE INVENTION

Accordingly it is an object of the present invention to provide a novel and improved "neutral" position indicator for a joystick controller, the position indicator being of a "confirmation" or "redundant" type, that is, one which provides an independently obtained reading of the "neutral" position of the actuator member of a joystick, and one which utilizes components that are completely separate and distinct from the existing X-axis and Y-axis position sensors and their associated circuitry, as normally relied upon in conventional joystick constructions.

A related object of the invention is to provide an improved "neutral" position indicator as above set forth, which is extremely simple in operation, and which can be supplied as original equipment in a joystick assembly, or alternately supplied as an add-on or accessory, for an existing system.

Still another object of the invention is to provide an improved neutral position indicator of the type noted above, which, by virtue of its simplicity, has an extremely high degree of reliability, thereby virtually eliminating unexpected catastrophic type failures. The high reliability is largely a consequence of the provision of two separate and distinct, independent sets of sensing controls for the actuator member of the joystick, one set serving as the redundant-type indicator for providing confirmation-type neutral position readings.

Yet another object of the invention is to provide an improved neutral position indicator as above characterized, which utilizes few components in a simple configuration, thereby being inexpensive to produce, and thus lending itself to widespread commercial adaptability without materially increasing the overall cost of a joystick.

A still further object of the invention is to provide an improved neutral position indicator of the kind indicated, wherein precise readings confirming the neutral position of the actuator member of a joystick can be obtained quickly, and with virtually no uncertainty, thereby giving rise to exceptional reliability and increased safety. There are thus minimized potential hazards to operating personnel and/or factory equipment.

Still another object of the invention is to provide an improved method for installing a neutral position indicator in a joystick controller, which method is readily carried out and which utilizes a minimum of separate operations; the method employs simple electronic components that are readily available in the marketplace.

The above objects are accomplished by a neutral position indicator for a joystick-type controller, comprising in combination a movable control member having control positions which are reached from a given neutral position, and emitter-sensor means comprising a light source and a light sensor. The control member has a light-reflecting area thereon which traverses a predetermined field of travel as the member is moved between its various positions. The emitter-sensor means is disposed in the field of travel of the light-reflecting area of the control member and is adapted to produce an electrical signal from a reflected beam of light which is generated by and emitted from the light source, and is reflected from the reflecting area of the control member and onto the light sensor when the control member is in its neutral position.

The objects are further accomplished by control means comprising, in combination a joystick type control device having a joystick member, and having one or more electrical output means characterized by parameters which vary in accordance with the displacement of the joystick member from a neutral position in X-axis and Y-axis directions, toward control positions therealong. The joystick member has a light-reflecting area which traverses a predetermined field of travel as the member is moved along its control positions. There are provided emitter-sensor means comprising a light source and a light sensor, both the source and the sensor being disposed in the field of travel of the light-reflecting area of the joystick member and being adapted to produce an electrical signal from a reflected beam of light. The beam is initiated at and emitted from the the light source and is reflected from the reflecting area of the joystick member and onto the light sensor only when the control member is in its neutral position.

The objects are still further accomplished by the provision of a novel method for measuring or sensing the neutral position of a joystick controller's actuator member. In the practice of the method, the joystick controller comprises a movable joystick actuator member having an end portion, and comprising electrical circuit means for measuring the angular displacement of the joystick member from a central, neutral position and in both X-axis and Y-axis directions. These directions lie in a plane that is substantially perpendicular to the joystick member when the latter is disposed in its neutral position. The method of the invention in effect provides a redundant indication, via a separate and distinct signal from that of the electrical circuit measuring means, to detect movement of the joystick member from its neutral position, and comprises the steps of placing a light source and a light sensor in juxtaposition with one another, in a zone corresponding to the location of the end portion of the joystick member when it is in its neutral or central position; providing a light-reflective surface on the end portion of the joystick member; energizing the light source so as to emit a beam of light toward the zone; and measuring the output of the light sensor to determine if light from the light source is striking the reflective surface, so as to be reflected therefrom and be beamed back toward the light sensor. Such a reflected beam thus indicates the presence of the reflective surface in the zone, which corresponds to the joystick member being disposed in its neutral position. The measurement so obtained is separate and distinct from that of the electrical circuit measuring means of the joystick controller, thereby providing an independent and redundant indication of the position of the joystick member when it is disposed in its neutral position. Significantly improved reliability in the determination of the neutral position of the joystick member is realized as a consequence of this redundant or "confirmation" reading of the neutral position.

The objects are further accomplished by the provision of a novel method for measuring or sensing the neutral position of a joystick controller actuator member. The joystick controller comprises a base and an elongate movable member pivotally carried by the base. The elongate movable member has an inner end portion and is movable on the base between a central, neutral position, and radially-extending angularly displaced positions. In particular, the method is intended generally to detect, in a redundant manner or fashion, movement of the joystick member away from its neutral position, and comprises the steps of placing a radiation source and an electro-responsive radiation sensor in juxtaposition with one another in the base at a zone therein adjacent to the location of the end portion of the movable member when it is in its central or "neutral" position; the method further comprises the steps of establishing a radiation-reflective surface on the end portion of the member; energizing the radiation source so as to emit a beam of radiation at the zone; and measuring the response of the electro-responsive radiation sensor to determine if radiation from the radiation source is striking the radiation-reflective surface and being reflected therefrom, and thereafter being beamed back toward the radiation-sensor. The method thus indicates the presence of the reflective surface in the center of the zone, this corresponding to the movable member being disposed in its neutral position.

Other features and advantages will hereinafter appear.

BRIEF DESCRIPTION OF THE DRAWINGS

In the drawings, illustrating a preferred embodiment of the invention:

FIG. 1 is a vertical section of a joystick controller incorporating, as an example, position sensors of the Hall-effect type, and including an independent "neutral" position indicator constructed in accordance with the principles of the present invention.

FIG. 2 is a top plan view of the controller of FIG. 1.

FIG. 3 is a schematic circuit diagram of a joystick controller utilizing the Hall-effect sensors of FIGS. 1 and 2, for providing X-axis and Y-axis output signals corresponding to displacement of the joystick actuator member from a central or "neutral" position, and toward various adjusted positions on either side of the "neutral" position.

FIG. 4 is a schematic circuit diagram of a typical integrated circuit Hall-effect sensor as employed with the controller of FIGS. 1–3.

FIG. 5 is a fragmentary view taken on the line 5—5 of FIG. 1.

FIG. 6 is a schematic circuit diagram of the emitter-sensor chip of FIG. 5, and including biasing/load resistors associated therewith, and FIG. 7 is a bottom plan view of the control member of the joystick controller, showing a reflective surface on the tip of the bottom end of the member, and illustrating in dotted outline, a substantially circular zone of movement of the bottom end during the operation of the joystick controller.

DESCRIPTION OF THE PREFERRED EMBODIMENT

Referring to the FIG. 1, there is provided a joystick or joystick-type controller including an electronic circuit which produces output voltages that are indicative of the X-axis and Y-axis positions of the joystick handle.

In FIGS. 1 and 2 the joystick is generally designated by the numeral 10, comprising a housing 12 having a base 14, a cover 16 for the base 14, and a bearing plate 18 for mounting a handle or joystick actuator member 20. The cover 16 and bearing plate 18 each have a central aperture which forms part of a pivot socket 22. The handle 20 has a manually-engageable knob 23, return spring 24, and a ball 26 which is held captive in the socket 22. The spring 24 maintains the handle 20 in a normal vertical or "neutral" position with respect to the base 14.

By way of example, a joystick controller of the type utilizing Hall-effect sensors as position indicators will be described hereinbelow, although the present invention is applicable to any type of joystick controller. Referring again to FIG. 1, there is mounted on the base 14 an electrical energizing coil 28 of doughnut-like configuration, having a central opening 30 and electrical leads 32, 34. The handle of actuator member 20 has a magnetic core 36 which, in the illustrated construction, extends through the central opening 30 of the coil 28. The core 36 can be constituted of any suitable magnetic material, such as iron or steel, alloys thereof, ferrite, or equivalents.

Also, there are provided four proximity sensors 38, 40, 42, and 44 adjustably mounted in the base 14, in positions such that they are subjected to the magnetic field provided by the energizing coil 28 and the magnetic core 36. As noted above, the proximity sensors, can take the form of Hall-effect devices that are magnetic-responsive. Three sensors 38, 40 and 42 are shown in FIG. 1, whereas all four sensors 38, 40, 42 and 44 are shown in FIGS. 2 and 3. In the latter figure, the triple leads of the sensors 38, 40, 42, and 44 are labelled 46, 48, and 50; 52, 54, and 56; 58, 60, and 62; and 64, 66, and 68, respectively. These numerical designations have been omitted from FIG. 1, for clarity.

Again, as an example, a typical Hall-effect sensor 38 is shown in FIG. 4. The sensors 40, 42 and 44 are identical to each other, and to the sensor 38. The sensors 38, 40, 42, and 44 are in the form of integrated circuit packages each having three leads, such as those labelled 46, 48, and 50. The integrated circuit packages each contain a Hall-effect semiconductor 70 and a follower stage or amplifier 72 which boosts the signal from the Hall-effect semiconductor 70. Biasing resistors 74 and 76 are associated with the amplifier 72. The integrated circuit packages are commercially available in the trade, being known as Hall Sensor Integrated Circuits, or Hall Sensor ICs, such as manufactured by Texas Instruments, under the part number TI 173.

In the present instance, the Hall-effect sensors provide a predetermined output voltage, typically +6 volts d.c. with superimposed a.c., when the actuator member 20 is in its central, or "null" position. This is also referred to as a "neutral" position. The a.c. component of the output voltage varies with changes in magnetic flux, as determined by the relative positioning of the actuator member 20 with respect to the sensors.

The actuator or control member 20 can pivot within limits, such that the lower end thereof moves laterally within a predetermined zone of travel, indicated in dotted outline at 21 in FIG. 7. Between these limits lies an infinite number of control positions, as can be readily understood.

The magnetic flux generated in the energizing coil 28 is alternating or fluctuating. Correspondingly the magnetic flux sensed by each of the four Hall-effect sensors 38, 40, 42 and 44 is fluctuating, and as noted above the output of each Hall-effect sensor is typically characterized by a particular d.c. level with superimposed a.c. component.

In the electronic circuit 77 illustrated in FIG. 3, all d.c. components of the output signals of the Hall-effect sensors 38, 40, 42, and 44, namely those d.c. levels on lines 50, 56, 62, and 68, respectively are completely blocked by series coupling capacitors 78, 80, 82, and 84, respectively. The series capacitors isolate those portions of the electronic circuit 77 which follow the capacitors 78, 80, 82, and 84, from the effects of d.c. magnetic fields sensed by the Hall-effect sensors 38, 40, 42, and 44, respectively. Such d.c. components would otherwise interfere with readings of the position of the actuator member 20. Even the magnetic field of the earth, which for all practical purposes can be considered relatively stationary, or d.c. over the short term, is sufficiently strong to alter the d.c. components of the outputs of the Hall-effect sensors 38, 40, 42, and 44.

Further, the electronic circuit 77 processes the a.c. components of the outputs of the Hall-effect sensors 38, 40, 42, and 44, and converts them to a pair of d.c. voltages, one of the pair of voltages corresponding to the position of the actuator member 20 in an X-axis direction, and the other one of the pair of voltages corresponding to the position of the actuator member 20 in a Y-axis direction. These voltages appear on output terminals 86, 88 respectively.

Referring again particularly to the schematic diagram of FIG. 3, the various components of the circuit 77 are supplied with +12 volts d.c., as indicated by the terminals labelled "+12". These terminals are all connected together by a common line (not shown), hereinafter referred to as a positive supply line.

The energizing coil 28 is connected between the line supplying +12 volts and the collector 90 of a switching transistor 92. A protective diode 94 is connected across the coil 28, to suppress induced voltages which would otherwise be present when the coil 28 was excited by a pulsed voltage. The base 96 of transistor 92 has a biasing resistor 98.

Amplifier 100 is connected as a square wave generator, and produces pulses on line 102, at a frequency of typically 1000 Hz. These are in turn applied to the base 96 of transistor 92, through resistor 104. Associated with the square wave generator are resistors 106, 108, 110, and 112, and capacitor 114. The transistor 92 thus switches on and off at a rate of 1000 Hz, which, via transistor 92, applies a 1000 Hz signal to the energizing coil 28. Current through the coil is approximately 20 mA. a.c., and the applied signal is actually in the form of a symmetrical square wave.

A reference voltage of typically +6.0 volts d.c. is provided by a second amplifier 116; the voltage applied to the noninverting input is set by resistors 118 and 120. The amplifier 116 has 100% negative feedback, and its function is to provide a steady, regulated voltage on line 122; the line 122 thus constitutes a low-impedance, constant voltage d.c. supply line which provides +6 volts d.c. to the inputs of various other amplifiers, as will be described below. Capacitors 124, 126 and 128 are filters, for reducing noise.

As shown in FIG. 3, two leads of each of the Hall-effect sensors are connected to the positive supply line and to ground, respectively. The third lead of each device is the output, these leads being labelled 50, 56, 62, and 68 respectively. As noted above, connected to each output is a series coupling capacitor 78, 80, 82, and 84, respectively which effectively blocks all d.c. components in the output signals. In series with capacitors are resistors 130, 132, 134, and 136 respectively, which in turn are connected respectively to the inverting input of a first amplifier 138, the non-inverting input thereof, the inverting input of a second amplifier 140, and the non-inverting input thereof. The voltage gain of amplifier 138 is determined by resistors 130 and 142, whereas the gain of amplifier 140 is set by resistors 134 and 144. Bias for the non-inverting input of amplifier 138 is obtained through resistor 146, which extends to the reference voltage line, +6 volts; similarly, bias for the non-inverting input of amplifier 140 is obtained through resistor 148. Capacitor 150 constitutes a by-pass, to limit noise on the supply line.

The outputs 152, 154 of amplifiers 138, 140 respectively are fed to two input terminals 3 and 6 of a quad analog switch 156. Only two of the four switches (shown dotted) in this device are employed in the present circuit. Capacitor 158 reduces noise on the supply line. The quad analog switch 156 has terminals labelled 1, 4, 5, 8, 9, and 16, as shown. The trigger input terminals 1 and 8 are fed from a divider string consisting of resistors 160 and 162. A Zener diode 164 provides protection against overvoltage, for the trigger input terminals 1 and 8 of the quad analog switch 156.

Resistor 160 in turn extends to a coupling capacitor 166, which is connected to the output 102 of the square wave generator 100. Capacitor 166 and resistors 160 and 162 thus constitute a differentiating circuit which converts the square wave at the output 102 of the generator 100 to short pulses, each typically having a length of 50 microseconds. These pulses are applied at a frequency, or pulse repetition rate of 1000 Hz, to the trigger input terminals 1 and 8 of the quad analog switch 156. The arrangement is such that the quad analog switch 156 conducts (i.e. connects input terminal 3 to output terminal 2, and connects input terminal 6 to output terminal 7) during the peak of the fluctuating signal at the outputs 152 and 154 of amplifiers 138 and 140, respectively; with the conductions thus provided by the quad analog switch 156 during such peaks, capacitors 168 and 170, connected to the two output terminals 2 and 7 respectively of the quad analog switch 156, charge up to the peak values of the waves at the outputs of the amplifiers 138 and 140 respectively. The quad analog switch 156 and the capacitors 168 and 170 thus function as peak detectors, or sample and hold circuits. The respective voltages across capacitors 168 and 170 are essentially d.c.

In effect, the quad analog switch 156 and capacitors 168, 170 constitute rectifying circuits, which rectify the a.c. component of the waves at the output terminals 152 and 154 of amplifiers 138 and 140, respectively. The rectified waves are filtered by the capacitors 168 and 170, respectively.

The arrangement reduces the effect of stray a.c. magnetic fields on the readings of the position of the actuator member 20. This is accomplished by triggering the analog switch 156 in synchronism with, or in phase with the a.c. components of the outputs of the Hall-effect sensors. The triggering of the analog switch occurs at a given phase point on the outputs of the Hall-effect sensors, and at the same point during each cycle. Thus, any stray a.c. field which does not have the exact same frequency and phase relationship with the 1000 Hz output from the square wave generator 100 will have difficulty in passing through the quad switch and will thus not adversely affect the d.c. levels on the capacitors 168 and 170. These d.c. levels ultimately determine the d.c. voltage readings on output terminals 86 and 88.

The d.c. voltages on terminals 2 and 7 are fed respectively into voltage follower amplifiers 172 and 174, respectively, each having a voltage gain of one. The outputs of these amplifiers 172 and 174, respectively are in turn connected, through variable resistors 176 and 178 respectively, to the inputs of additional, variable gain amplifiers 180 and 182, respectively; the gain of amplifier 180 is determined by resistors 184 and 176, whereas that of amplifier 182 is determined by resistors 186 and 178. The non-inverting input of each amplifier 180,182 is connected to the reference line 122, which, as noted above, is maintained at +6 volts d.c. Setting the gains of amplifiers 180 and 182 is effected by adjusting the variable resistors 176 and 178, respectively.

With the above arrangement, there are provided electrical parameters comprising a pair of voltages at the output terminals 86 and 88, respectively of amplifiers 180 and 182. That appearing on the output terminal 86 of amplifier 180 is indicative of displacement of the actuator member 20 of FIG. 1 in the X-axis direction (FIG. 2), whereas that appearing on the output terminal 88 of amplifier 182 is indicative of the displacement of the actuator member 20 in the Y-axis direction.

Thus, the present arrangement achieves the desired result, namely obtaining two d.c. voltages on terminals 86 and 88 respectively, that are indicative of the X and Y positions, with high accuracy and freedom from error due to stray d.c. magnetic fields. Also eliminated are other errors as might arise from temperature drifts, aging of the components, or other forms of incidental interference.

This result was not previously obtainable with prior controllers where a bar magnet was carried on an actuator member, and wherein Hall-effect sensors were employed to sense the variation in the d.c. magnetic field as the member was moved. In such a situation, stray d.c. fields upset the readings. In addition, over time, the flux provided by the bar magnet weakened, also distorting the readings.

The a.c. signal provided by the energizing coil 28 is relatively constant with time; temperature variations appear as common-mode changes in the a.c. signal, and are balanced out by the provision of the differential amplifiers 138 and 140. All d.c. components in the outputs of the Hall-effect sensors are completely blocked by the series capacitors 78, 80, 82, and 84. Thus, stray d.c. magnetic fields have absolutely no effect on the voltages applied to the first amplifiers 138 and 140. The voltages on the non-inverting inputs of amplifiers 138 and 140 are characterized by a d.c. level determined by the d.c. voltage on the reference line 122, with a superimposed a.c. signal which depends on the amplitude of the signal received from the respective Hall-effect sensor 40, 44. The voltages on the two inverting inputs of amplifiers 138 and 140 are also characterized by a d.c. level with a superimposed a.c. signal received from the respective Hall-effect sensor 38, 42.

Also, initial adjustments in the physical positions of the Hall-effect sensors can be made in order to compensate for slight offsets which may occur. The adjustments can be made by frictionally mounting the Hall-effect sensors 38, 40, 42, and 44 on four small brackets indicated 188 mounted on the inner surface of the housing 12, and which permit adjusting-type movements of any or all of the Hall-effect sensors 38, 40, 42, and 44 toward or away from the core 36; the initial adjustment is made while the latter is disposed at its center or neutral position, by observing the voltages on terminals 86 and 88 respectively. Following adjustment, the sensors can be cemented in position.

Excellent linearity can be attained with the disclosed system. In actual tests performed on working models, linearity between the movement of the actuator member 20 and the variation in output voltages on lines 86 and 88 from amplifiers 180 and 182, respectively, can be held to 5% or better.

Amplifiers 138, 140, 180, and 182, while shown as separate, can be contained in a single package, known as a quad amplifier; a typical component type would be an LM 324, manufactured by National Semiconductor. Similarly, the four amplifiers 100, 116, 172, and 174 can be of this same type, contained in a single package. In such a case, the capacitor 150 provides filtering for the power lead for all four amplifiers 138, 140,180, and 182, while the capacitor 124 provides filtering for the power lead for the four amplifiers 100,116, 172, and 174.

The quad analog switch can be a type LF 13331, also manufactured by National Semiconductor.

In accordance with the present invention there is provided, in addition to the X-axis and Y-axis output signals on lines 86, and 88, which are indicative of the corresponding X-axis and Y-axis positions of the actuator or control member 20, an especially simple yet highly reliable supplemental "neutral" position indicator which functions as a redundant or back-up confirmation of the position of the actuator member 20 when it is in its neutral position. The supplemental indicator is shown in FIGS. 1, 6 and 7, and is seen to be entirely separate and distinct from the sensors 38, 40, 42, and 44 and the circuitry associated therewith, to thus enable a secondary reading of a "neutral" position to be accurately indicated.

By the invention, the supplemental "neutral" position indicator comprises an emitter-sensor means 190, FIGS. 1 and 6, which preferably is in the form of a combined radiation- or light-source 192 and an electro-responsive device or light-sensor comprising a phototransistor 194, contained in a single package as an optical-electronic chip. In addition, by the invention the bottom of the actuator member 20, indicated 196, is provided with a light- or radiation-reflective transverse surface or area 198. In the present instance, this surface is preferably formed by nickel plating a mirror-like surface or layer on the end of the member 20. The surface is preferably planar, and lies perpendicular to the axis of the member 20. The nickel plated surface is polished to produce a reflective or shiny characteristic. Typically the reflective surface has a cross-dimension of substantially 0.030–0.040 inches. Other types of reflective means could be employed, such as a separate mirror affixed to the bottom of the member, as can be readily understood. The use of a nickel plate has been found to be very economical, however.

The emitter-sensor means 190 is mounted physically within the base 14, at a location just below the bottom end 196 of the actuator member 20, FIG. 1, such that there is no interference with the member 20 as it moves across its zone or field of travel, indicated 21 in dotted outline in FIG. 7. The light-source 192 emits a beam of light continuously, being powered from the +12 volt line, FIG. 6, through resistor 200. The light-sensor 194 is similarly connected to the +12 volt line through a load resistor 202. Output voltage on line 204 changes according to the presence or absence of light striking the sensor 194. The sensor 194 comprising the phototransistor is rendered conductive when it is struck by light, corresponding to a low output voltage on line 204, and rendered non-conductive in the absence of light, striking the sensor 194 corresponding to a high output voltage on line 204. When the member 20 is disposed in an angular position other than its "neutral" position, there occurs little or no reflection of the beam by the reflective surface 198 and the output 204 of the light-sensor 194 is high (i.e. a digital "one"). On the other hand, when the member 20 is near or at its neutral position, the light beam from the light-source 192 is received by the reflective surface 198 of the member 20, which in turn re-transmits much of the beam back toward the light-sensor 194, causing the output thereof, line 204, to assume a low level (a digital "zero"). The schematic diagram showing the electrical connections to the emitter-sensor 190 is given in FIG. 6. Output line 204 can connect to a suitable indicator (not shown). The indicator can take the form of a light or light-emitting diode (not shown), or alternately can be merely a buffer stage (not shown) whose output extends to suitable processing circuitry (such as a safety interlock circuit, not shown), as dictated by the particular requirements of the user.

With such an arrangement involving an independent detector circuit, FIG. 6, that is mostly isolated from the circuit of FIG. 3, a highly reliable, independent back-up or confirmation signal is always present on the separate output line 204, to indicate when the member 20 is in its central or "neutral" position. The signal so obtained thus constitutes a separate and distinct digital-format confirmation signal, which supplements certain ones of the existing analog-type voltages obtained on the output lines 86 and 88 of FIG. 3.

This can have important advantages, as in the case where positioning of the member 20 at its "neutral" position must be positively verified, and in the event of a malfunction of one or both of the X-axis and Y-axis indicator circuits of FIG. 3. Significantly improved reliability results. There is greatly reduced the possibility of a malfunction of the system of FIG. 3 leading to injury to personnel, or damage to the equipment being controlled (not shown).

Further, in accordance with the present invention there is provided a novel method of responding to the attainment of a neutral position of a joystick controller, as for example, that of FIGS. 1 and 3, comprising essentially the following steps: 1) providing a mirrored or reflective surface 198 on a minute area or end 196 of an actuator member or joystick 20, placing the joystick 20 in its neutral position, locating an emittersensor optical-electronic device or chip 190 in a position spaced a minute distance from the mirrored surface 198, and at a point where it does not interfere with the movement of the joystick 20, and thereafter electrically energizing the emitter portion 192 of the emitter-sensor chip, and conducting the electrical response of the optical sensor portion 194 of the chip to a point remote from the chip, via a line 204.

In the construction illustrated, the chip 190 can be of a type known by the part number SFH 900 or SFH 905, manufactured by Siemens. The chip 190 is known as a miniature light reflection emitter/sensor, and is readily available commercially. In this unit, the source and sensor are disposed side by side, in juxtaposition with one another as in FIG. 5. The preferred spacing between the mirrored or reflective surface 198 of the actuator member 20 and the chip 190 is typically one millimeter, which gives near optimal response characteristics. The distance between the socket 22 and the reflective surface 198 is typically 0.625 inch.

The range within which the indicator of FIGS. 1 and 6 will provide a "neutral" reading has, in actual tests, been found to be on the order of 0.5 to 2.0 degrees on either side of its center or "neutral" position. As noted above, this reading on line 204 is completely independent of that obtained by the position sensors 38, 40, 42, and 44 described above, and thereby provides a safety check or confirmation of the position of the joystick actuator member when the latter is in its neutral position.

From the above it can be seen that I have provided an especially simple redundant-type neutral position indicator for a joystick controller, the device being both inexpensive to manufacture and produce, and highly reliable in operation, as a consequence of its relatively few parts. The position indicator is applicable to any type of joystick controller, either as part of the original equipment, or as an add on circuit.

The independent nature of the electrical connections associated with the indicator render it largely isolated from the remainder of the joystick controller, and not subject to interaction therewith.

The output from the indicator is in digital form, easily adapted for control of an interlock, or other safety type device.

The present structural combination as thus described, and the method associated therewith, are thus seen to represent a distinct advance and improvement in the field of electro-mechanical controllers.

Variations and modifications are possible without departing from the spirit of the invention.

Each and every one of the appended claims defines an aspect of the invention which is separate and distinct from all others, and accordingly it is intended that each claim be treated as such when examine din the light of the prior art devices in any determination of novelty or validity.

What is claimed is:

1. An electronic joystick-type controller, comprising in combination:

a) a base, b) a manually-operable control member, and means pivotally mounting said control member on the base for solely pivotal, non-translational movement between a central neutral position and other non-central control positions in X-axis and Y-axis directions, c) said control member having a light-reflecting area thereon which traverses a predetermined field of travel as the member is moved between its various positions, and d) emitter-sensor means disposed at a predetermined, fixed distance from the light-reflecting area of the control member when the latter is in its neutral position, for producing an electrical signal in response to receiving light reflected from the reflecting area of the control member, said emitter-sensor means comprising a light source and a light sensor both fixedly located adjacent the field of travel of the light-reflecting area of the control member, said light sensor being responsive to light reflected thereto from the light-reflecting area of the control member solely when the control member is disposed in its central neutral position, e) said light being no longer reflected onto said light sensor from the light-reflecting area when the control member is moved out of said neutral position and in any of said other non-central control positions in X-axis and Y-axis directions, thereby to extinguish said produced electrical signal.

2. The invention as set forth in claim 1, wherein:

a) said control member comprises an elongate joystick, and said light-reflecting area comprises a reflective surface disposed at the bottom end of the joystick.

3. The invention as set forth in claim 1, wherein:

a) said control member comprises an elongate joystick, and said light-reflecting area comprises a polished surface disposed at the bottom end of the joystick.

4. The invention as set forth in claim 1, wherein:

a) said control member comprises an elongate joystick, and the light-reflecting area comprises a reflective end of the joystick.

5. The invention as set forth in claim 2, wherein:

a) said reflective surface is generally planar, and disposed in a plane which is substantially perpendicular to the axis of the joystick.

6. The invention as set forth in claim 2, wherein:

a) said reflective surface has a cross-dimension of substantially 0.030–0.040 inches.

7. The invention as set forth in claim 2, wherein:

a) said reflective surface comprises nickel plating on the end of the joystick, said nickel plating being polished and rendered reflective.

8. The invention as set forth in claim 2, wherein:

a) the distance between the reflective surface and the emitter-sensor means is on the order of 1 millimeter when the control member is in its neutral position.

9. The invention as set forth in claim 2, wherein:

a) said pivotal mounting means comprises a pivot, and b) the distance between the pivot and the reflective surface is on the order of 0.625 inch.

10. The invention as set forth in claim 11, wherein:

a) said control member comprises a joystick type control device comprising a joystick member, said joystick type control device having electrical output means characterized by parameters which vary in accordance with the displacement of the joystick member in said X-axis and Y-axis directions, b) said electrical output means being separate and distinct from said emitter-sensor means, and the electrical signal from said emitter-sensor means constituting an independent and redundant digital indicator for confirming when the joystick member is in solely its neutral position as opposed to its being displaced toward one of said other, non-central control positions in said X-axis and said Y-axis directions.

11. The invention as set forth in claim 10, wherein:

a) said joystick type device output means comprises an electrical output line having an electrical signal of predetermined magnitude when the joystick member is disposed in its neutral position, b) said electrical signal from the emitter-sensor means occurring in a second electrical output line which is distinct and apart from said first-mentioned electrical output line.

12. The invention as set forth in claim 1, wherein:

a) said emitter-sensor means comprises an integrated circuit package containing said light source and said light sensor disposed physically side by side.

13. A neutral position indicator for a joystick-type controller, comprising in combination:

a) a movable control member having control positions which are reached from a given neutral position, b) said member having a light-reflecting area thereon which traverses a predetermined field of travel as the member is moved between its various positions, and c) emitter-sensor means comprising a light source and a light sensor, said means being disposed in the field of travel of the light-reflecting area of the control member and being adapted to produce an electrical signal from a reflected beam of light which is initiated at and emitted from the said light source and is reflected from said reflecting area of the control member and onto the said light sensor when the control member is in its neutral position, d) said control member comprising an elongate joystick, and said light-reflecting area comprising a reflective surface disposed at the bottom end of the joystick, e) said emitter-sensor means comprising a phototransistor, said phototransistor being excited by light reflected from the said reflective surface and thereby being rendered electrically conductive when the joystick is disposed in its neutral position, and being rendered electrically non-conductive when the joystick is moved by a pre-determined angular displacement, away from said neutral position.

14. The invention as set forth in claim 13, wherein:

a) said pre-determined angular displacement is on the order of 0.5–2.0 degrees, measured from the neutral position.

15. In an electromechanical controller comprising a base and an elongate movable member pivotally carried intermediate its ends by said base and characterized by solely pivotal, non-translational movement thereon, said elongate movable member being movable between a central, neutral position and angularly displaced X-axis and Y-axis directed positions, the method of providing an electrical indication to detect placement of the movable member away from its central, neutral position, comprising the steps of:

a) providing a radiation-reflective surface on an end portion of the movable member so as to pivotally move therewith, b) placing a radiation source and an electro-responsive radiation sensor in juxtaposition with one another on the base and adjacent to the reflective surface of the movable member and spaced a predetermined, fixed distance from said reflective surface when the member is disposed in its central, neutral position, said sensor being capable of an electrical output, c) energizing the radiation source so as to direct radiation at said reflective surface solely when the movable member is disposed in its central, neutral position, said radiation being reflectable back toward said sensor, and d) monitoring the electrical output of the sensor to determine a change therein resulting from solely pivotal movement of the reflective surface from a position wherein it is directed at said sensor to a position wherein it is directed away from said sensor so that the radiation no longer strikes the sensor, said output change being indicative of placement of the movable member away from its central, neutral position.

16. The method of claim 15, wherein:

a) the step of providing the radiation-reflective surface comprises the step of polishing the said end portion of the movable member so as to render it reflective.

17. The method of claim 15, wherein:

a) the step of placing the radiation source and radiation sensor in juxtaposition comprises the step of positioning the said source and sensor within 1 millimeter of the said end portion of the movable member when the latter is in its neutral position.

18. Control means comprising, in combination:

a) a joystick type control device having a joystick member, said device having a plurality of electrical output means, one of said output means being characterized by parameters which vary in accordance with the angular displacement of the joystick member from a central, neutral position toward X-axis and Y-axis directions corresponding to control positions disposed on different sides of said neutral position, b) said joystick member having a light-reflecting area thereon which traverses a predetermined field of travel as the member is moved between its various positions, and c) another of said electrical output means comprising an emitter-sensor means constituted of a light source and a light sensor, said emitter-sensor means being disposed adjacent the field of travel of the light-reflecting area of the joystick member and producing a supplemental electrical signal that is separate and distinct from the signal of said one electrical output means, said supplemental signal being produced from reflected light which is initiated and emitted from the said light source and reflected from said reflecting area of the joystick member and onto the light sensor solely when the joystick member is disposed in its neutral position and not when the joystick member is displaced in either the said X-axis direction or the Y-axis direction.

19. In a joystick controller, the method of responding to the attainment by an elongate joystick which has a predetermined girth at one end, of a neutral position with respect to X-axis directions and Y-axis directions, which includes the steps of providing a reflective surface on a minute area of the joystick, said area being characterized by a cross-dimension which is less than the girth of the said one end of the joystick, placing the joystick in its neutral position, locating an emitter-sensor optical-electronic chip in a position spaced a fixed, predetermined distance from said reflective surface and at a point which is in direct axial alignment with the axis of the joystick solely when the joystick is disposed in its neutral position, electrically energizing the emitter portion of the emitter-sensor chip so as to transmit light toward the said reflective surface to be reflected back toward the sensor portion of the chip, and monitoring the electrical response of the sensor portion of the chip to indicate lateral displacement of the joystick away from its neutral position and toward one of said X-axis directions or said Y-axis directions, said change resulting from movement of said reflective surface to a position directed away from said chip.

* * * * *